Figure 1:
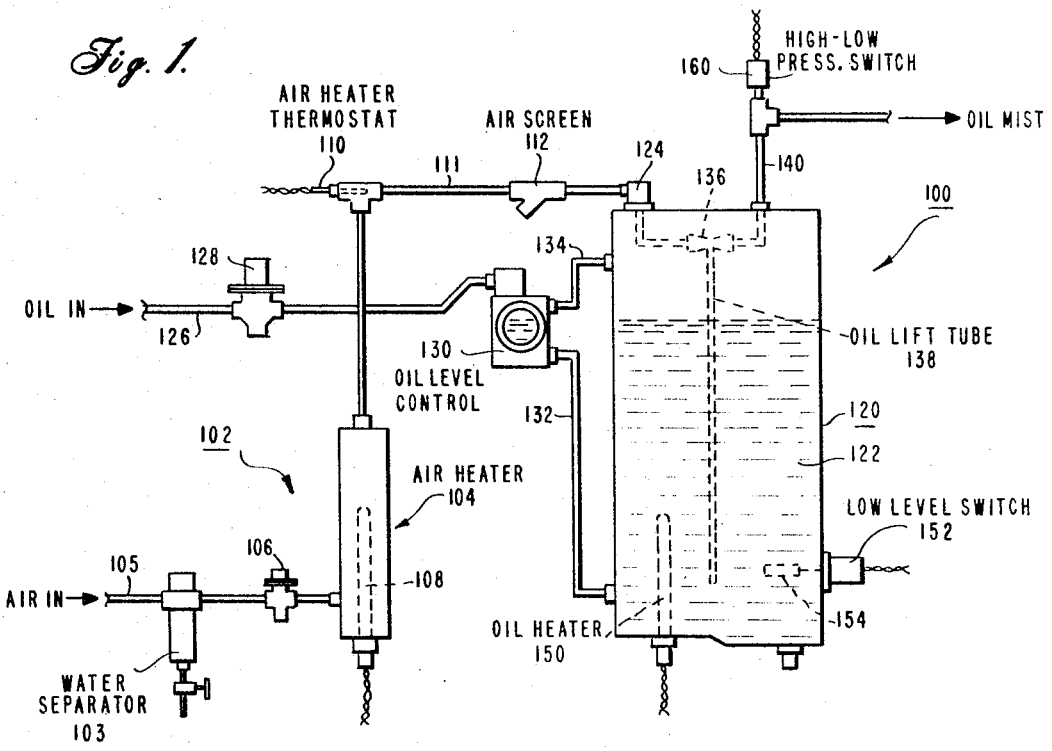
Figure 2:
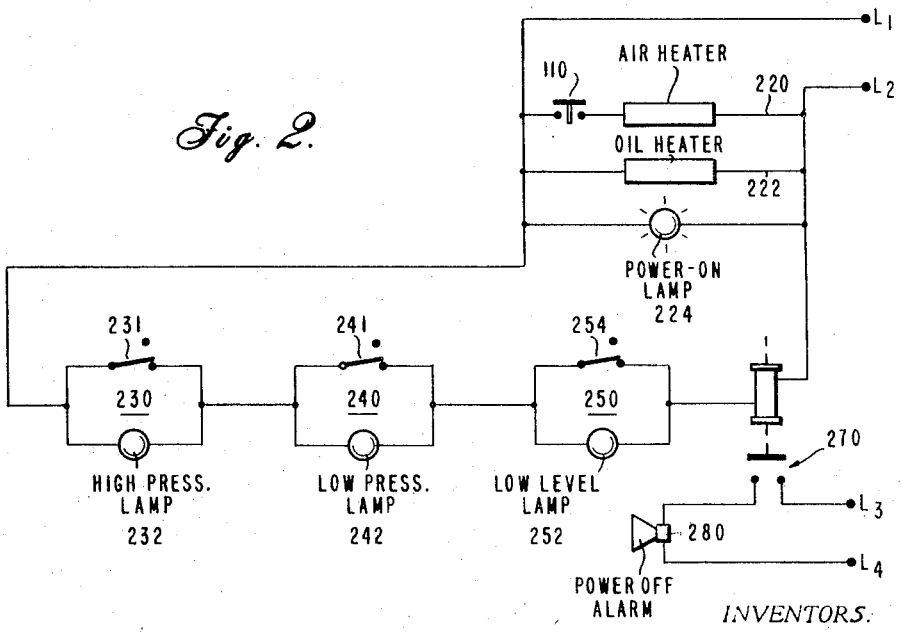

T862004

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 22

601,146

AIR-OIL MIST GENERATING DEVICE WITH ALARM MEANS

Andrew W. Whitaker, 2105 Missouri, and Otto P. Mullins, 115 Wooster, both of Baytown, Tex. 77520

Filed Dec. 12, 1966. Published May 6, 1969

Int. Cl. G08b *7/06*

U.S. Cl. 340—412

1 Sheet Drawing. 9 Pages Specification

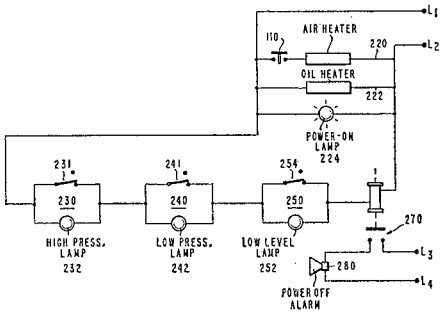

The present invention is directed to an oil-mist generating system wherein a pool of heated oil is maintained in a reservoir and is drawn up through a tube into a venturi section by the action of a high velocity air stream. Within the venturi, the oil is formed into a mist carried by the air for use as a lubricant.

An electrical control system is provided for use with this device comprising three parallel circuits containing an air heater, an oil heater, and a power-on lamp. A fourth parallel circuit contains in series lamps for indicating high and low pressures and low oil level. Neon glow lamps are used for the indicating purposes, in parallel with individual switches operated by two-position solenoids.

Power-off alarm means are also provided to indicate a failure of electrical power.

T862004

SN - 601146

May 6, 1969 A. W. WHITAKER ET AL DEF. PUB.

AIR-OIL MIST GENERATING DEVICE WITH ALARM MEANS

Filed Dec. 12, 1966

*INVENTORS:*

ANDREW W. WHITAKER,
OTTO P. MULLINS,

BY Sylvester H. Brock Jr.

ATTORNEY.